United States Patent [19]
Stana et al.

[11] 3,791,526
[45] Feb. 12, 1974

[54] SOLVENT WELD ADHESIVE FOR REVERSE OSMOSIS MEMBRANES

[75] Inventors: Regis R. Stana, Murrysville; Edward Mitchell, Wilkinsburg; John B. Coffay, Media, all of Pa.

[73] Assignee: Westinghouse Electric Corporation, Pittsburgh, Pa.

[22] Filed: Aug. 10, 1971

[21] Appl. No.: 170,598

[52] U.S. Cl.............. 210/321, 210/433, 210/490, 210/500
[51] Int. Cl............................................. B01d 31/00
[58] Field of Search .......... 210/490, 500, 321, 433; 106/196; 260/37 FP

[56] References Cited
UNITED STATES PATENTS

| | | | |
|---|---|---|---|
| 3,645,938 | 2/1972 | Clarke et al. | 106/196 X |
| 3,156,608 | 11/1964 | Kamins et al. | 106/196 X |
| 3,610,418 | 10/1971 | Calderwood | 210/490 X |
| 3,138,509 | 6/1964 | Cox et al. | 106/196 X |
| 3,619,459 | 11/1971 | Schrader | 210/500 X |
| 3,285,765 | 11/1966 | Cannon | 106/196 X |

Primary Examiner—Frank A. Spear, Jr.
Attorney, Agent, or Firm—F. Shapoe et al.

[57] ABSTRACT

A method of sealing a reverse osmosis membrane to a contacting porous support comprises applying a sealant composition, comprising a cellulose ester, an organic solvent and an alcohol to the membrane and its contacting support.

4 Claims, 2 Drawing Figures

SOLVENT WELD ADHESIVE FOR REVERSE OSMOSIS MEMBRANES

BACKGROUND OF THE INVENTION

This invention relates to sealing cellulose acetate or other cellulose ester semipermeable membranes onto porous support modules made of bonded, resin coated filler particles, in a reverse osmosis apparatus.

Osmosis occurs when two solutions of different concentrations in the same solvent are separate from one another by a membrane. If the membrane is ideally semipermeable, that is, if it is permeable to the solvent and not to the solute, then a flow of solvent occurs from the more dilute into the more concentrated solution. This continues until the two solutions become equal in concentration, or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process. Reverse osmosis systems have application in many areas such as making potable water from brackish or polluted water and cleaning up waste streams.

Resin bonded sand module membrane supports, and as those disclosed in copending U.S. Pat. Ser. No. 754,581, filed on Aug. 22, 1968, now U.S. Pat. No. 3,598,241, were found to be self-supporting and capable of fabrication into rigid modules, with good permeability and a smooth osmotic membrane support surface. Such sand modules, however, tend to leak at the membrane sealing points.

The membrane sealant used with the sand module is required to set in the presence of water since the membrane after being placed or cast on its support must be kept wet or it loses its semipermeable properties. This has created problems, since most amine curing agents do not perofrm well under this condition, resulting in a soft sealant material with little mechanical strength.

The reverse osmosis apparatus disclosed in copending U.S. Pat. Ser. No. 855,491, filed on Sept. 5, 1969, now U.S. Pat. No. 3,610,418, used peroxide curing agents or dry molecular sieves in epoxy and polysulfide rubber membrane sealant compositions. These membrane sealants tended to occasionally cause the porous module terminal end face to crack due to sealant shrinkage upon cure.

There is a need, therefore, for improved reverse osmosis membrane sealants that can be cured in water or high humidity, to seal the membrane and its supporting module, providing a water tight, pressure resistant seal which will not crack the resin bonded sand module ends.

SUMMARY OF THE INVENTION

Briefly, the above mentioned problems are solved by draining water from a porous support, made of resin bonded filler particles, having at least one bore therethrough containing a leached, modified cellulose acetate semipermeable reverse osmosis membrane therein, and then applying a membrane-module sealant, comprising a cellulose ester, an organic solvent capable of dissolving cellulose esters, and an alcohol to the contacting membrane ends and module ends in a high humidity atmosphere.

BRIEF DESCRIPTION OF THE DRAWINGS

For a better understanding of the invention, reference may be made to the referred embodiments, exemplary of the invention, shown in the accompanying drawings, in which.

DESCRIPTION OF THE PREFERRED EMBODIMENTS

Figure 1:
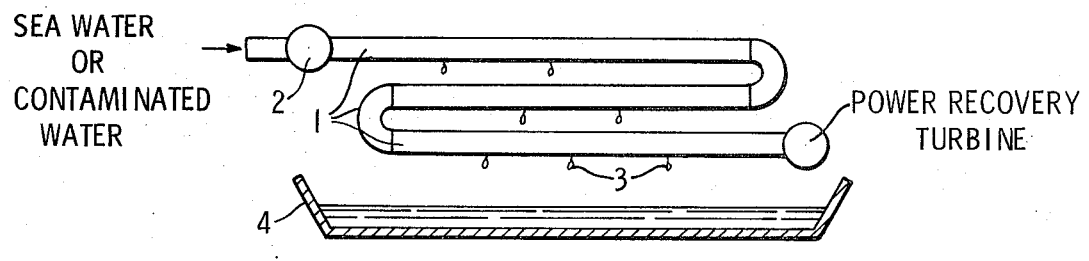
FIG. 1 is a diagram showing the principle for extracting fresh water from sea or contaminated feed water by reverse osmosis.

FIG. 1 illustrates a typical tubular type reverse osmosis system. Sea water or other feed is pumped through a battery of support tubes 1. The pump 2 must exert a pressure greater than the osmotic pressure of the feed and can operate as high as 4,000 psi. The tubes can be mounted in batteries of about 150 each. They serve to support the reverse osmosis membrane contained within and contacting the tube wall. The membrane can be made of a cellulose ester, usually modified cellulose acetate compositions by methods well known in the art and described for example, in U.S. Pat. No. 3,310,488, 3,344,214 and 3,133,132.

The tube walls that support the reverse osmosis membranes must be able to withstand the pressure exerted on them by the pump and must be able to allow egress of the purified effluent 3 into a collecting means 4. For sea water, several stages of this type may be required before the permeate water is usable.

In the fabrication of the modules used as a support in this invention, a resin, usually in solution, with an added catalyst, is coated onto filler particles in such a way as to leave a thin, dry, uncured film on each filler particle. The resulting particulate composition is free flowing and is cast into a mold of the desired configuration generally a tubular module having one or more retractable tubes, cores, or other means to form the bores in the module. The mold is then heated to cure the resin. The mold is then cooled and the tubes removed, leaving the bore or bores of the desired configuration in the module. The curing process transforms the filler-resin catalyst composition into a strong, rigid, open pore tubular support of bonded resin coated filler particles with a thin film of resin bonding each filler particle to the adjacent particles. The tubular support contains voids or pores between the resin coated filler particles allowing egress of the pure water permeate which has passed through the reverse osmosis membrane supported by the inside of the tube bores.

The finely divided filler particles that can be used in the module may be spherical, oval, cubical, or of other irregular configuration. Some examples of suitable filler paticles are foundry sand, silica, silicon carbide, zircon, quartz, alumina, beryl, glass, limestone, magnesium aluminum silicate, calcium silicate, sillimanite ($Al_2O_3SiO_2$) or any other rigid filler with a granular structure that is compatible with the resin system it is used with.

The preferred average particle size range of fillers for use in the module construction is between about 50 and 250 microns, although the outer limits are between 40 and 500 microns. Below 40 microns, the resin-filler support tube lacks the desired porosity for low resistance to water flow and above 500 microns the tube does not properly support the osmotic membrane.

A variety of resins can be used to coat the filler particles in the module, but phenolic resins are preferred because they can be bought cheaply and in readily usable form. Phenolic resins are well known in the art and are thoroughly discussed in Megson, *Phenolic Resin Chemistry*, Academic Press, 1958, particularly chapter 3. They are conventionally obtained by reacting a phenolic substance such as phenol itself or substituted phenols such as cresols, xylenols, or butyl phenol with an aldehyde such as formaldehyde, propionaldehyde, acetaldehyde, benzaldehyde or furfural.

Other resins well known in the art which may be used as the coating and bonding agent in the resin bonded filler module of this invention include: polyglycidyl ethers (see Lee and Nevill, *Handbok of Epoxy Resins*, McGraw Hill, 1966, particularly chapter 2), polyesters and allyl resins (see Bjorksten, *Polyesters and Their Applications*, Reinhold Publishing Corporation, 1956, pages 1–34), silicones and furane resins (see Brydson, *Plastic Materials*, D. Van Nostrand Co. 1966, chapters 24 and 25), polyimide and polyamide-imide resins (see Frost and Bower, *Aromatic Polyimides*, J. Polymer Science, Part A, Volume 1, 1963, 3,135–3,150 and U.S. Pat. Nos. 3,179,631; 3,179,632; 3,179,633 and 3,179,634 on polyimides and U.S. Pat. No. 3,179,635 on polyamide-imides).

The weight percent resin that can be used to coat the filler particles used to make the modules of this invention will range from about 1 to 18 percent of the coated filler particle weight. On a volume basis the range would be about 4 to 32 percent resin for the fillers enumerated. Above these ranges the resin will tend to clog up the pores between the filler particles in the tube causing poor effusion of the pure water. Below these ranges the support tube will not be strong enough for the pressures required in this water purification process.

Figure 2:
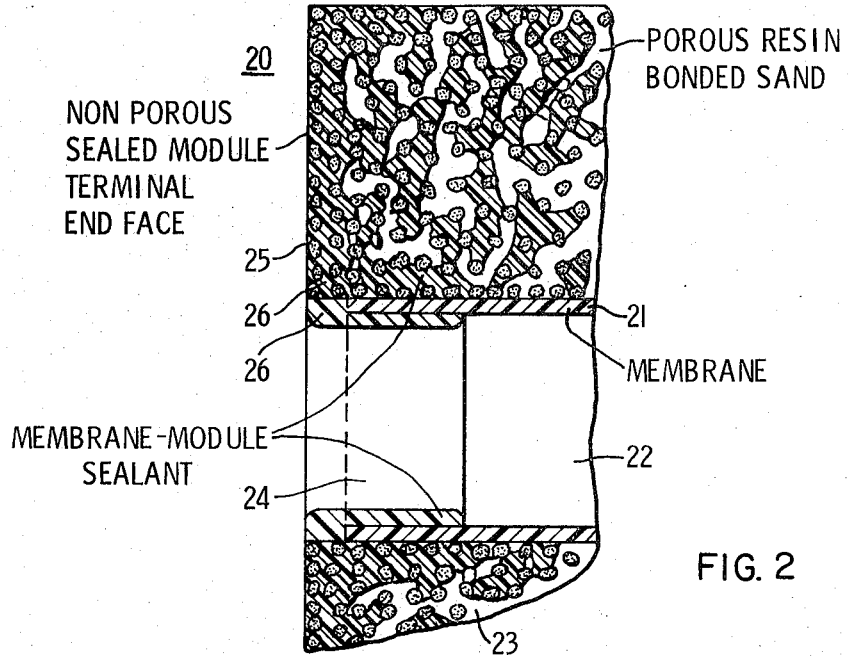
FIG. 2 is a cross sectional view of the end of one type of a membrane support made of resin bonded filler particles showing the sealant contacting both the membrane and the support.

Referring now to FIG. 2 of the drawings, a side elevational view of th resin bonded module 20 is shown, with a modified cellulose acetate reverse osmosis membrane 21 contacting and lining one of the module feed water bores 22 to within about one-quarter inch of the module end.

The porous resin coated filler particle matrix 23 contains the permeate. The membrances inserted or cast into the support module must be sealed to their support at or near the end 24 of the feed water bore near the terminal ends of the module 25.

The main problem of sealing the ends of the membranes, lining the feed water bores, against the bore ends is that the cellulose acetate membranes must be kept wet or they lose their rejection properties after drying for about 20 minutes and can shrink by as much as 40 percent of their original diameter. Conventional adhesives either contain solvents which completely destroy the membrane, or the water prevents adhesion and complete curing of the sealant.

It has been found that the membrane can be sealed with a suitable liquid-impermeable sealant 26. Such sealant should have a low viscosity and must cure with minimal shrinkage, otherwise the sand support module can crack, especially if it is a tubular module containing a large number of bores. The sealant shrinkage can be no greater than 4 percent post gellation shrinkage i.e., percent change in volume of the sealant composition after the liquid stage has been passed and the gellation or thermoplastic stage has been reached, including thermal shrinkage brought about by cooling of the solid sealant to room temperature. The sealant must also cure in the presence of water and not destroy the cellulose acetate membrane ends or the resin bonding the sand together. It must be adherable to the membrane alone or with the use of a primer based on polyurethane, furane, or vinyl acetate resin which can be used to first make the membrane tacky. It should also help to seal the joint between the porous support and the metal shell of those modules having an external metal shell, to provide additional support at high pressures.

We found that an adhesive consisting of a cellulose ester, such as, for example cellulose acetate, cellulose acetate-butrate, cellulose propionate, and mixtures thereof, a water miscible organic solvent capable of dissolving cellulose ester such as, for example, aliphatic ketones exemplified by acetone, and methyl ethy ketone and esters of aliphatic acids exemplified by ethyl acetate, and low carbon chain alkanol such as, for example, methanol, ethanol, n-propanol, isopropanol and butanol, provides an excellet sealant solution. This sealant will weld two pieces of cellulose acetate membrane together and adhere to both a wet membrane and wet sand to create a high pressure water-tight seal. The membrane weld can be dried in a few minutes in air or the weld can be formed in water. The weld using this sealant only slightly alters the general shape and pliability of the membrane.

The apparent mechanism by which the weld, between two membranes or between the contacting membrane and sand module takes place, is that the alcohol in the solution locally reduces the the surface tension of the water in the membrane or sand, and causes the water to be repelled from the site of the adhesive weld, apparently by the Marangoni effect. The adhesive solution can then flow into the pores of the sand module or membrane where it can solvent weld to the membrane or phenolic coated sand.

The membrane sealant must contain between about 13 to 17 wt. percent cellulose ester, 55–70 wt. percent organic solvent capable of dissolving cellulose esters, and 16–35 wt. percent alcohol. The weight ratio of organic solvent: alcohol must be between 5:1 to 2:1. If the organic solvent is present more than five times the alcohol, the solution will have little if any welding power. The membrane sealant composition may also contain up to about 20 wt. percent filler particles such as colloidal silica and colloidal alumina having an average particle size range from about 0.001 to 150 microns, to reduce shrinkage and thicken the composition.

The nature of the tubular porous support module allows the reverse osmosis membranes to be cast and leached in place inside the module feed bores. The leading step to form the osmotic skin of the membrane after the membrane film is cast will usually involve immersion of the module containing the cast membrane in cold water, alcohol, or othe suitable leaching liquid. Prior to applying our sealant, this excess water or other leaching liquid should be drained fom the module pores preferably in a humidity chamber.

Needless to say, the module sealant composition of this invention can be used in a variety of other reverse osmosis apparatus configurations, for example, it can be used to bond flat cellulose ester reverse osmosis membranes to flat supports which may be made of resin bonded filler particles.

EXAMPLE I

A reverse osmosis apparatus was made, containing 18 parallel one-half inch diameter membrane containing axial bores in a porous support and a stainless steel perforated outer shell, having means to supply feed, exhaust feed and collect the purified water. The support was made from foundry sand, having an average particle size of about 180 microns, and the resinous reaction product of a phenol and an aldehyde, in solution, having a viscosity at 25° C of 400 cp. and a solids content at 135° C of 67 percent. The phenolic resin along with hexamethylenetetramine catalyst was mixed with sand to uniformly coat it. The mixture was then poured into the shell, which acted as a mold and contained removable rods, and cured at about 175° C in a Normal kiln oven. The resulting module contained resin in the range of about 5 weight percent of the coated filler particle weight. The module was 48 inches long and 4 inches in diameter.

Osmotic membranes were cast in place, within the axial bores through the module, from a casting solution containing about 25 weight percent cellulose acetate, 45 weight percent acetone and 30 weight percent foramide (methanamide). The membranes were leached in place by immersing the module containing them in cold water, to form an osmotic skin.

The module was then allowed to stand vertically for 5 minutes to allow most of the water used in leaching the membrane to drain from the module pores and the module end face was cut and filed flush with the outer shell.

The membrane-module sealant composition was mixed, containing 200 ml. acetone (160 gr. or 68 wt. percent) 50 ml. n-propanol (40 gr. or 17 wt. percent) and 35 gr. cellulose acetate powder (15 wt. percent). The cellulose acetate was added to thicken the mixture to the consistencey of a thick varnish. The mixture had a post gellation shrinkage of about 2 percent.

Membrane sealant was applied in several coats on the membrane and ends of each bore with each coat being allowed to dry for about 5 minutes. The sealant overlapped the membrane end and welded it to the bore end and module end face. The module was then inverted, and the same procedure followed as above to seal the other end of the module.

End flanges were bolted on and the module tested. The seals successfully operated at 300 psi for over 500 hours continuously with no leakage or failure.

We claim as our invention:

1. A reverse osmosis apparatus to provide purified permeate from a feed liquid comprising:
    a. a porous reverse osmosis membrane support made of bonded resin coated filler particles,
    b. a cellulose ester semipermeable reverse osmosis membrane in contact with the resin bonded filler support,
    c. a cured liquid impermeable sealant composition contacting the membrane and support and bonding them together to provide a high pressure watertight seal, said sealant composition before curing comprising:
        1. about 13 to 17 wt. percent cellulose ester,
        2. about 55 to 70 wt. percent organic solvent capable of dissolving cellulose esters, and
        3. about 16 to 35 wt. percent of a low carbon chain alkanol and wherein the weight ratio of organic solvent:alkanol is between 5:1 to 2:1, said composition having a post gelation shrinkage of up to about 4 percent,
    d. means to supply feed liquid to the apparatus,
    e. means to exhaust feed liquid from the apparatus, and
    f. means to collect the permeate.

2. The reverse osmosis apparatus of claim 1 wherein the porous support is a module having a flat end face and at least one bore therethrough containing therein a tubular semipermeable cellulose ester membrane.

3. The reverse osmosis apparatus of claim 2 wherein the filler making up the module is sand having an average particle size between about 40 and 500 microns, the resin bonding said particles together comprising from about 1 to 18 percent of the coated filler particle weight, the resin being selected from the group consisting of phenolics, polyglycidylethers, polyesters, silicones, polystyrenes, polyimides, polyamide-imides, allyl resins and furane resins and the membrane is a modified cellulose acetate membrane.

4. The reverse osmosis apparatus of claim 2 where, in the sealant composition, the alkanol is selected from the group consisting of methanol, ethanol, n-propanol, isopropanol and butanol and the organic solvent is selected from the group consisting of aliphatic ketones and esters of aliphatic acids and wherein the flat end faces of the support module are sealed with the sealant composition to fill the pores between the resin coated filler particles to provide a liquid impermeable end face.

* * * * *